(12) United States Patent
Both (10) Patent No.: US 7,332,007 B2
(45) Date of Patent: Feb. 19, 2008

(54) DUSTING DEVICE WITH MULTIPLE STREAM NOZZLES

(75) Inventor: Reinhold Both, Gelsenkirchen (DE)

(73) Assignee: CFT GmbH Compact Filter Technic, Gladbeck (DE)

(*) Notice: Subject to any disclaimer, the term of this patent is extended or adjusted under 35 U.S.C. 154(b) by 234 days.

(21) Appl. No.: 10/865,969

(22) Filed: Jun. 14, 2004

(65) Prior Publication Data

US 2004/0250520 A1 Dec. 16, 2004

(30) Foreign Application Priority Data

Jun. 13, 2003 (DE) .................. 103 26 601
Mar. 17, 2004 (DE) .............. 10 2004 012 967

(51) Int. Cl.
*B01D 47/06* (2006.01)
(52) U.S. Cl. ............... 55/385.5; 95/214; 95/215; 95/216; 95/225; 95/228; 95/202; 96/297; 96/300; 96/356; 96/358; 96/361; 96/399; 55/467; 55/491; 55/501; 299/12; 299/64; 210/791; 210/797; 210/798; 210/411; 210/333.01
(58) Field of Classification Search ........... 55/385.5, 55/467, 491, 501; 95/214, 215, 216, 225; 95/228, 202; 96/356, 361, 358, 297, 300, 96/399; 6/358; 210/791, 797, 798, 411, 210/333.01; 299/12, 64
See application file for complete search history.

(56) References Cited

U.S. PATENT DOCUMENTS

| 885,185 | A | * | 4/1908 | Serrell ..................... 96/249 |
| 2,213,911 | A | * | 9/1940 | Highhouse .................... 96/358 |
| 3,006,436 | A | * | 10/1961 | Starbuck et al. .............. 96/300 |
| 3,325,973 | A | * | 6/1967 | Illingworth ................... 95/154 |
| 3,686,833 | A | * | 8/1972 | Rush ........................... 96/239 |
| 3,733,789 | A | * | 5/1973 | Rebours ....................... 96/297 |
| 3,795,089 | A | * | 3/1974 | Reither ........................ 96/262 |
| 3,888,642 | A | * | 6/1975 | Toyama ....................... 96/376 |
| 4,140,501 | A | * | 2/1979 | Ekman ........................ 96/232 |
| 4,153,432 | A | * | 5/1979 | Beman et al. ................ 95/214 |
| 4,249,778 | A | * | 2/1981 | McGuire ...................... 299/64 |
| 4,380,353 | A | * | 4/1983 | Campbell et al. ............. 299/12 |
| 4,976,210 | A | * | 12/1990 | Dewald ....................... 110/246 |
| 5,145,236 | A | * | 9/1992 | Liao et al. .................... 299/12 |
| 5,300,131 | A | * | 4/1994 | Richard ....................... 96/297 |
| 6,129,852 | A | * | 10/2000 | Elliott et al. ................ 210/791 |
| 6,312,504 | B1 | * | 11/2001 | Both et al. .................... 95/214 |
| 2003/0177755 | A1 | * | 9/2003 | Shingu et al. ........... 60/39.092 |

* cited by examiner

*Primary Examiner*—Duane Smith
*Assistant Examiner*—Minh-Chau T. Pham
(74) *Attorney, Agent, or Firm*—James Creighton Wray; Clifford D. Hyra (57) ABSTRACT

A dedusting device 1 with a demister 15 advantageously arranged standing obliquely has a very compact construction because sufficient moistening or wetting of dust-containing crude air 24 is possible through the use of intensively acting multiple stream nozzles 33. The ventilator 11 is allocated to its own ventilator housing 18 that is connected to the dedusting device housing 10 and has a muffler 20 inserted downstream.

21 Claims, 4 Drawing Sheets

Fig.1

DUSTING DEVICE WITH MULTIPLE STREAM NOZZLES

This application claims the benefit of German Application No. 103 26 601.1 filed Jun. 13, 2003 and German Application No. 10 2004 012 967.3 filed Mar. 17, 2004.

BACKGROUND OF THE INVENTION

The invention concerns a dusting device for use behind or on dust-generating machines and/or facilities in underground mine and tunnel construction with a dusting device housing which has a demister provided with moistening nozzles and a drip catcher, to which a ventilator with drive arranged in the input side/output side region is allocated.

Such a dusting device is known from German Patent 198 53 190 A1. This known dusting device possesses a ventilator that is arranged between input and output side, thus in the crude gas stream, that is, in front of the demister and the drip catcher. Not only are moistening nozzles allocated to or arranged in front of the demisters, but also the ventilator wheel, which is consequently subjected to stress not only from dust, but also from drops of water. Additional moistening nozzles are arranged in the region of the transmission so that the previously moistened dust reaches the region of the demister. The nozzles arranged there spray in the direction of the demister to promote a separation of the mud in the demister. Apart from the numerous moistening and water nozzles inserted in front, it is disadvantageous that no uniform water mist is specified which leads to a moistening of the dust transported with the crude gas. Furthermore, it is disadvantageous that no compact construction of the dusting device is possible owing to the arrangement described, but rather only a long, extended construction.

SUMMERY OF THE INVENTION

The invention is therefore based on the objective of creating a dusting device, which generates the finest water droplets and which operates optimally even with an intermittently strong dust load.

The objective is realized in accordance with the invention in that the moistening nozzles arranged in front of the demister in the direction of the air current are constructed as multiple stream nozzles whose individual nozzles are distributed yielding a common spraying pattern, and in that the ventilator is positioned in the clean gas flow behind the demister and drip catcher.

It is surprising that it is possible to construct the entire dusting device housing in a very compact fashion, whereby the ventilator or the ventilator housing is "relocated." No pre-arrangement of nozzles generating water mist is required due to the intensive moistening of the dust by the multiple stream nozzles, and the ventilator can consequently be arranged behind the demister and drip catcher as it is no longer required for the even moistening of the crude gas or the crude air. This has the additional great advantage that the ventilator wheel as such is subjected to stress neither by water drops nor by dust particles nor by mud particles. Instead, it is accommodated in the "secured" space behind the demister and the drip catcher. Since several multiple stream nozzles are provided that respectively have a common spraying pattern, a screen of fine water mist can be specified through which dust particles can only get through after having been moistened correspondingly. They are then securely caught in the demister and drawn off while water droplets still remaining are caught in the drip catcher and likewise eliminated. Consequently, only no longer hazardous clean air reaches the region of the ventilator and in particular the ventilator wheel. A dusting device of this type can be used in many ways due to reduction of the structural dimensions. Apart from this, it operates basically more efficiently due to the special construction and the manufacturing costs are much more economical.

According to an appropriate design of the invention, it is provided that the ventilator is allocated to a ventilator housing that can be coupled to the dusting device housing and outfitted with sound insulation. It is now possible on the basis of the special construction of the dusting device to allocate an independent housing to the ventilator and therewith also an appropriate sound insulation. This means that the ventilator housing as such contains a sound insulation so that the noise stress of a dusting device of this type is also basically reduced. An appropriate sound insulation could not be allocated to the ventilator incorporated into the dusting device housing of the old model on account of the structural dimensions. A dusting device of the invention therewith optimally satisfies the environmental protection provisions which are becoming ever more rigorous.

According to a further design, a muffler is allocated to the ventilator housing as sound insulation, preferably connected downstream in series from it. In allocating an appropriate sound insulation, an appropriate reinforcement of the wall of the ventilator housing serves as sound insulation, while when the muffler is connected downstream in series, the exiting noises of the clean air or the sound proceeding from the ventilator are minimized.

It has already been indicated above that, due to the favorable structural dimensions of a appropriately combined dusting device, the possibility exists of allocating it directly to the dust generators. Correspondingly, it is provided in accordance with the invention that the dusting device and ventilator housing are arranged on a driving machine in the coupled state, preferably in the region between the extraction arm and the conveyor. With an arrangement of this type, the dusting device can be arranged in such a way that it directly sucks in and eliminates dust generated by the extraction head so that the danger that parts of the air current reach past into the stretches or into corresponding spaces does not exist in the first place. Moreover, the described arrangement is a type of pivoting on the driving machine so that here too a need for additional space does not arise. Instead, the compact dusting and ventilator housing can be simply incorporated into available space.

In order to prevent the entry of dust particles or even stones into the demister and to protect it therewith from damage, the invention provides that the demister is located with an inclination towards the crude air directly on the input side, whereby the upper edge is constructed with a projection in relation to the lower edge. In this way, the upper edge almost serves as protection for the demister arranged downstream in series so that it does not need special protection. Stone or coarser dust particles falling down from the roof are consequently not carried along by the air current, but they fall through the air current and accumulate on the floor.

In order to be independent of the motion of the extraction arm and the conveyor, it is provided that the dusting and ventilator housing possess their own supports with which they are braced on the drive assembly. Consequently, the two housings are directly connected with the drive assembly and, therefore, keep their position independently of that of the extraction arm in particular but also that of the conveyor.

In the described positioning of the dusting device and the ventilator housing, the clean air is carried out through the conveyor. In order to prevent new dust from arising here, the invention provides that the output side of the dusting housing or the ventilator housing has a steering nozzle. This steering nozzle ensures that the clean air is carried off in such a way that it cannot act upon the conveyor material. This steering nozzle is adjustable so that the direction in which the clean air is carried off can be adjusted.

An even stress of the demister and the drip catcher with dust or with moist air is attained in accordance with the invention in that air baffles are arranged between demister and drip catchers and the floor sheet is positioned with an inclination in the direction of the drip catcher. The water-dust mixture or the mud is passed through the inclined floor sheet in the direction of the drip catcher to be carried off with the wastewater or it can also be separated according one's wishes. The mud is then led into a settler or eliminated in another manner, so that the demister and drip catcher can be reached constantly in a uniform fashion through the corresponding air currents.

It has been pointed out above that the multiple stream nozzles, which are used in accordance with the invention bring about a very intensive moistening of the flowing dust. This can be especially achieved by the fact that the multiple stream nozzles are arranged that the discharge is directed toward the crude air. Thus, they generate a very intensive and dense water mist of the finest droplets so that a rapid and secure depositing of the inflowing dust is brought about. The dust can then be caught in the demister and eliminated as described.

The even and dense mist is achieved via the access surface of the demister in accordance with the invention in that the multiple stream nozzles are allocated to a support frame positioned in a slant corresponding to the inclination of the demister. Consequently, the multiple stream nozzles spray their water mist into the crude air whereby an even thickness of the water mist is assured for the overall surface of the demister through the described arrangement, hence independently from whether the crude air brushes along the upper cover of the dusting device housing, in the middle or in the floor region.

In order to be able to monitor the status of the demister and drip catcher easily and rapidly, and to simultaneously conduct an exchange or, or to be able to perform other operations in this region, inspection doors, preferably rotary doors, are provided on the dusting device housing in the region of the demister and the drip separator. By using rotary doors, it is ensured that these components are available again immediately after the inspection operations are concluded, and that they are also positioned exactly as is appropriate for their operation. The inspection doors must be provided with seals always ensuring their correct seat and sealing with appropriate construction.

The multiple stream nozzles used are equipped with a large number of individual nozzles which in accordance to the invention are uniformly energized with pressurized water whereby the individual multiple stream nozzle has a compact housing that is outfitted with a distribution space to which the individual nozzles are connected spraying into one another. All individual nozzles are consequently energized with the same pressure because they are energized with pressurized water from one and the same distribution space. They are arranged in such a way that they spraying into one another in order to generate an even sprinkling pattern that is important for an even wetting of the dust.

A refinement ensures uniform generation of a spraying or sprinkling pattern according to which the individual nozzle of multiple stream nozzles has the same diameter and identical discharge bore holes. They are arranged at a certain distance in relation to one another and form a uniform sprinkling pattern, whereby due to the even pressure and the even dimensions, it is ensured that they do not mutually influence and impede each other, but rather yield or result in an even spraying pattern.

Should a specified enlarged sprinkling angle be specified, it is advantageous if some of the individual nozzles are arranged emerging in the region of an incline of the nozzle basal surface, while one or more of these individual nozzles remain allocated to a plane of the nozzle basal surface. In this way, a greater spraying angle can be selectively generated that nonetheless ensures the necessary intensity or the required sprinkling pattern.

An even sprinkling pattern securely precipitating the dust is to be specified with the multiple stream nozzles, whereby the multiple stream nozzles with a smaller sprinkling angle (for example, 60°) and the multiple stream nozzles with a larger sprinkling angle (for example, 120°) are arranged on the supporting frame generating a full circular sprinkling pattern in accordance with the invention. It is conceivable, for example, that the multiple stream nozzles with a smaller spraying angle are accommodated on the outer edge and one or more with larger sprinkling angle are accommodated centrally on the supporting frame, so that the most intensive possible moisture or influence of the dust carried along by the crude air is assured.

It is also possible to proceed to blasting smoke clouds with the largely identical dusting device through an appropriate refinement of the present invention. Here it is provided that the moistening nozzles are inserted before the demister in the air current direction, that the ventilator is positioned in the clean gas stream behind the demister and drip catcher, and that additive containers are provided that are constructed and arranged in such a way that the discharge takes place through a dosing apparatus into the water feed pipe. In this way, it is possible to process and influence the blasting smoke cloud released by the blasting with the same outfitting, thus the same dusting housing, in such a way that the gases or the corresponding air rising in the clean gas current has no properties causing damage to the environment any more. It cannot be wholly ruled out that an odor nuisance occurs due to the compounds formed, but they can be separately influenced or be accepted as they cannot lead to human injury. With this solution, the moistening nozzles are arranged in such a way that they process the air current with intensity and can thus act upon it, so that the drops can then be removed from the air again in the demister inserted thereafter in order to be processed further separately, or be introduced into the clean gas stream in the form of air. The amount in additives is selectively removed from the additive containers through the respectively provided dosing device that is necessary and appropriate for the composition of the blasting smoke cloud.

It is then provided according to an appropriate refinement that a mixer allocated to the water feed pipe or incorporated into it is connected downstream in series after the dosing device so that the additives administered are mixed with the water before they are surrendered to the blasting smoke cloud through the moistening nozzles. It is apparent that the dosing device and also the post-positioned mixer must be addressed separately in order to prevent these additives from being admixed even during the precipitation of dust. The provision of further additives here is also conceivable, namely those that favor the precipitation of the dust.

Finally, the refined invention provides that a sprinkling device is inserted before the demister with drip collector either with simultaneous utilization of the usual moistening nozzles or, that a spraying device is provided upstream separated from the moistening nozzles generating finely dispersed drops connected with a water supplier or the water feeding tube and dosing device with mixer. According to the type of blasting smoke cloud or according to its composition, it can be quite appropriate to perform the preparation and processing of the blasting smoke cloud in two steps, namely on the one hand through the usual moistening nozzles and on the other hand through nozzles inserted in front of the moistening nozzles, whereby there is still the option of setting or selecting these nozzles inserted upstream to generate especially fine water drops without being able to mix with greatest intensity the blasting smoke cloud. Furthermore, it is possible as shown in the claim to use the nozzles that are only inserted in front of the moistening nozzles when it is a matter of cleaning the blasting smoke cloud, thus idling the moistening nozzles positioned thereafter during this processing step.

The precipitation of dusts arising when using machines and facilities in underground mining by nozzle spraying with water and therewith preparing the air is known. The blasting smoke clouds that arise when firing shots, thus during blasting, were previously sucked in through the existing ventilating doors and drawn off and as a rule without influencing this blasting smoke cloud and the nitrous gases contained therein in any form. The blasting smoke clouds are channeled into the sealing stream and mixed with it so that they no longer represent any danger due to the extensive reduction through mixing. According to recent regulations, releasing nitrous gases untreated into the atmosphere is not permitted. For this reason, the process of the invention provides that the smoke clouds that arises during blasting are acted upon with water nozzle-sprayed with the finest drops through the device precipitating the dust in succession to which additives are previously admixed that enter into an environmentally friendly compound with the nitrous and similar gases released during blasting. With this method the possibility exists of precipitating and preparing the harmful nitrous gases (NO) in such a way that they enter into compounds that are environmentally friendly. Thus no injury to humans and machines are caused. Any possible odor nuisances must be combated with suitable measures, whereby as a rule these odor nuisances remain negligible. Furthermore, it is advantageous that no separate apparatus is needed in this manner for preparing and rendering blasting clouds harmless. One can rather fall back on a correspondingly supplemented dusting device that is already in use in larger numbers in underground mining or which can be outfitted so that it can assume a double function.

Finally, the invention additionally provides that additive-enriched water is intensively brought into connection with the blasting cloud at a distance in front of the apparatus precipitating the dust and is sprinkled on it in order to perform either a double cleaning in this manner, namely in the introduced nozzles or in the normal nozzles also required for the precipitation of the dust or, only in the upstream nozzles. In this way, there exists a method, which can be used in many ways that can be actualized as needed and without additional major expense and that then ensures an effective precipitation or efficient rendering harmless of the dust and the nitrous gases.

The invention is in particular distinguished in that, due to a securely generated complete circular sprinkling pattern providing the finest droplets in front of the demister, there exists the possibility of constructing the entire dusting housing in a very compact fashion and of relocating the ventilator, first to protect it itself and secondly to outfit it with mufflers to satisfy the requirements of protectors of the environment. The individual nozzles of the multiple stream nozzles are arranged and distributed in such a way that a very intensive finest water mist is created in front of the demister that makes the use of additional water nozzles unnecessary. The moistened dust and mud material is precipitated in the demister and eliminated, while droplets remaining in the clean air are then caught in the drip catcher in order to be fed likewise from the air stream to a disposal unit. Viewed overall, due to the particular construction of the dusting device, the latter can be directly allocated to the machines directly generating the dust, for example a driving machine in order to fulfill here its objective selectively and at the proper place, namely by removing the dust from the atmosphere or out of the air in order to precipitate it and to satisfy the requirements of the mine authorities or other authorities in this way. In addition to precipitating the dust, it is possible to seal with the blasting smoke clouds that continuously accumulate at one time in underground mine and tunnel construction, especially when driving, with the same and only supplemented dusting device. Now as before, when driving on rock drifts as well as when driving on seams, blasting operations are not dispensed with or cannot be dispensed with because, for example, excessively small drift cross sections are present. It is especially advantageous with a dusting device of this type or also with corresponding methods that a separate device can be dispensed with and that the additional expenditure required here is relatively small, and that the success is considerable. First of all, it is possible not only to precipitate the dust with an apparatus of this type and to render it harmless, but also the blasting smoke cloud in succession.

Additional details and advantages of the object of the invention emerge from the subsequent description of the associated drawing in which a preferred design with the details and individual parts necessary for it are represented, wherein:

DETAILED DESCRIPTION OF THE PREFERRED EMBODIMENTS

Figure 1:
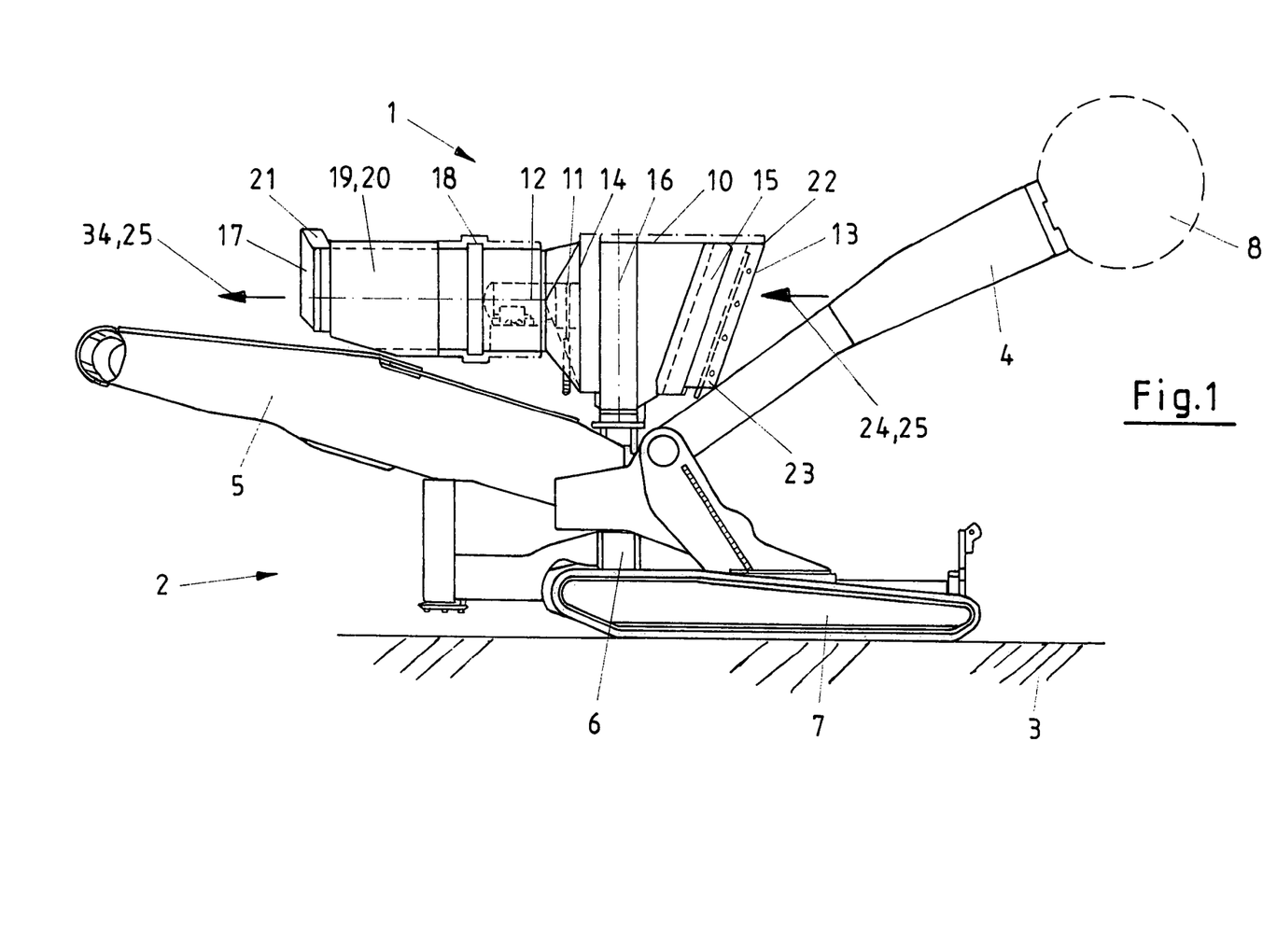
FIG. 1 illustrates a schematic driving machine with dusting device.

FIG. 1 shows in a side view a driving machine 2 with integral dusting device 1. The driving machine 2 is arranged in the line 3 (only indicated) of an underground advance and is equipped with the extraction arm 4 with extraction rollers 8 and the conveyor 5 positioned downstream. The dusting device 1 is directly allocated to the driving machine 2 and is connected with the drive assembly 7 through a support 6. It is thus braced on the drive assembly 7 in such a way that the position of the extracting arm 4 and the conveyor 5 do not influence its station.

It is recognizable in FIG. 1 that the ventilator 11 with its drive 12 is not arranged here between input side 13 and output side 14 of the deduster device housing, but rather beyond the demister 15 and the drip catcher 16 in its own ventilator housing 18. The ventilator housing 18 possesses a sound insulation 19 in the form of a muffler 20 so that exiting clean air has but a minor development of noise in the region of the output 17 of the ventilator housing 18.

A steering nozzle 21 is arranged at the output 17 of the ventilator housing 18, which ensures that the exiting clean air represents no stress for the operations inserted thereafter. The steering nozzle 21 can be adjusted as desired in order to guide the clean air in the direction of the roof or other regions of the drift.

It is also recognizable in FIG. 1 that the dusting device housing 10 has a special shape in the region of the demister 15, since the upper edge 22 considerably projects over the lower edge 23. Rock fragments or excessively large dust can consequently not reach the area of the demister 15.

The crude air is designated with 24 and the clean air with 34. Both also indicate the air current 25.

Figure 2:
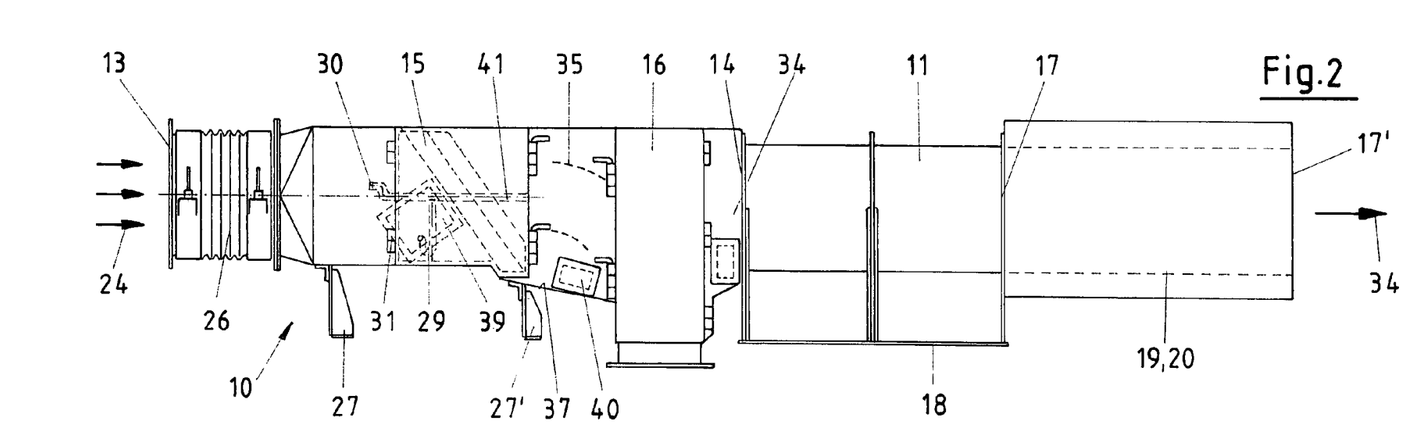
FIG. 2 illustrates a side view of a dusting machine with separate ventilator housing.

FIG. 2 illustrates a plan view on a demisting device 1 whereby the crude air is also designated with 24 here which flows from the ventilating connection 26 into the dusting device housing 10. The first contact with the water mist then takes place in this area that is generated through the moistening nozzles 29, 30, 31 in the form of the multiple stream nozzle 33. These multiple stream nozzles 33 discharge into the crude air, thus ensuring an intensive moistening of the dust carried along or the contact of water and dust. The separation of dust then takes place in the demister 15, while the air still carrying water droplets is then evenly distributed on the drip catcher 16 through the air baffles 35, 36. It is recognizable that the floor sheet 37 is inclined in such a way that the mud is either carried off and reaches the region of the drip carrier 16 or, it can, for example, be removed here by an inspection door 40. The overall dusting device housing 10 is braced through supports 27 on the floor whereby here the follow up ventilator housing 18 is also braced or is equipped with its own supports if need be.

The multiple stream nozzles 33 mentioned are allocated on a supporting frame 38 in order to ensure an even water mist in reference to the distance to the demister 15 that is inserted downstream at an incline. The water feed pipe is designated with 41 that provides these individual multiple stream nozzles 33 evenly with pressurized water.

An additional inspection door 39 is arranged in the region of the supporting frame 38 so that all these inspection doors 39, 40 are outfitted as swiveling doors in order to always guarantee the identical closing position.

A ventilator housing 18 is connected to the dusting device housing 10 in the region of the output side 14 in which the ventilator 18 is active with its ventilator wheel and ensures that the crude air 24 is sucked through the dusting device housing 10. The ventilator 11 itself is now still being energized only by clean air and the clean gas current is designated with 34. The latter leaves the ventilator housing 18 either at output 17 or output 17', namely when a sound insulation 19 is inserted downstream of the ventilator housing proper 18 in the form of a muffler 20.

Figure 3:
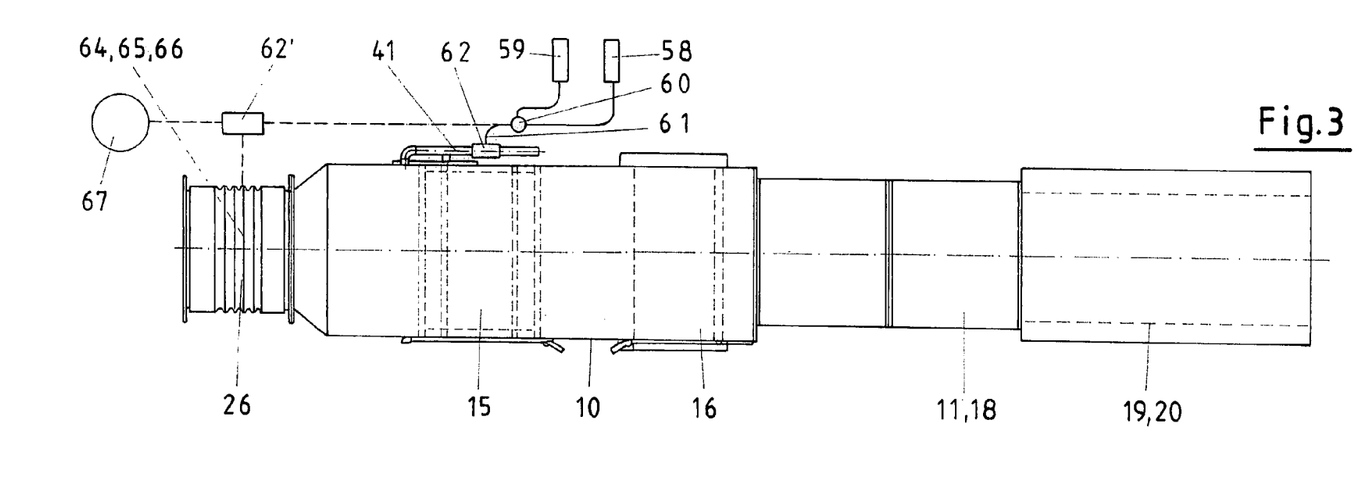
FIG. 3 illustrates a top view of the dusting device according to FIG. 2.

FIG. 3 depicts a top view of the dusting device 1 with the dusting device housing 10 and the ventilator housing 18 with muffler 20 inserted downstream, which serves as sound insulation 19. The dusting housing device 10 in which the demister 15 with the drip catcher 16 as well as the moistening nozzles 29, 30, 31 are inserted in front of the ventilator housing 18 proper. These moistening nozzles 29, 30, 31 are charged through the water feed pipe 41 which is normally connected with the normal water supply network. A mixer 62 is arranged in this water supply pipe 41 in such a way that it intensively mixes the fluid from the additive containers 58, 59 remotely guided through the bypass with the water flowing in the water feed pipe 41. The right amount of additives is admixed through the dosing apparatus 60 so that in the event blasting smoke clouds are sucked in, a water-additive mixture strikes upon the corresponding blasting smoke cloud via the moistening nozzles 29, 30, 31 ensuring that the nitrous gases led along by the blasting smoke cloud react in such a way that they become harmless. It is clear that in addition to additive containers 58, 59, additional additive containers can also be provided, for example also such containers that normally feed an additive into the water that is when operating the dusting device 1 in order to promote the precipitation of the dust. As a rule, the mixer 62 is only turned on when appropriate blasting smoke clouds are to be precipitated following blasting.

It can be appropriate in connection with especially intensive blasting smoke clouds, or for other reasons, to arrange a sprinkling device 64 upstream of the sprinkling apparatus and influencing apparatus for the blasting smoke cloud. This sprinkling apparatus 64 with nozzles 65, 66 is only indicated here in the region of the ventilation connection 26. The distance of this sprinkling apparatus 64 toward the moistening nozzles 29, 30, 31 can be correspondingly selected when needed. With this sprinkling apparatus 64 as well, the necessary additives are drawn off through the additive containers 58, 59 via the dosing device 60 in order then to ensure an intensive mixing through the mixer 62, especially when reserved water is to be admixed from the water supplier 67 as illustrated here.

Joint usage of the sprinkling apparatus 64 and the normal moistening nozzles 29, 30, 31 is conceivable or only the correspondingly improved and expanded moistening nozzles 29, 30, 31 or only the sprinkling apparatus 64. In this way there exists an optimal variety.

Figure 4:
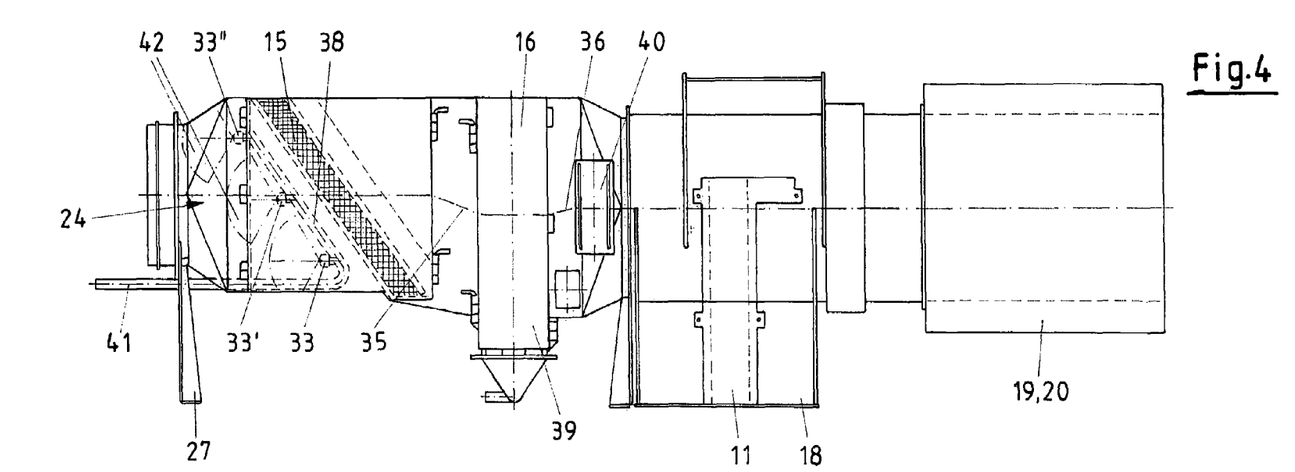
FIG. 4 illustrates an additional design of a dusting device with separate ventilator housing in elevation and FIG. 5 illustrates the construction of the dusting device according to FIG. 4 in top view.
Figure 5:
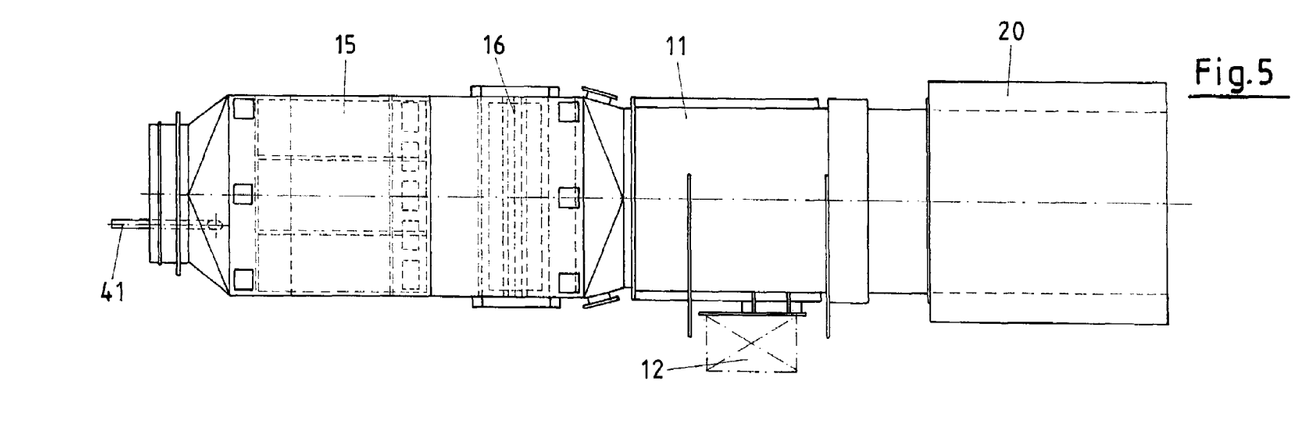

FIGS. 4 and 5 illustrate additional design options of the dusting device 1 consisting of the dusting device housing 10 and the ventilator housing 18. Here too, the demister 15 is arranged at an incline on the input side 13 of the dusting device housing 10 and energized with crude gas or crude air 24, whereby this crude air 24 must penetrate the water mist 42 which is generated by the multiple beam nozzles 33, 33', 33" before reaching the demister 15. The dust is moreover so intensively moistened that it is securely precipitated in the demister 15 and eliminated. Here too corresponding inspection doors 39 are provided through which the individual parts of the demister device housing 10 can be accessed. The ventilator housing 18 with the ventilator 11 and the drive 12 is positioned downstream of the dusting device housing 10. Here, too, a muffler 20 is arranged downstream of the ventilator housing 18 or the ventilator 11 to reduce the noise stress correspondingly significantly.

Figure 6:
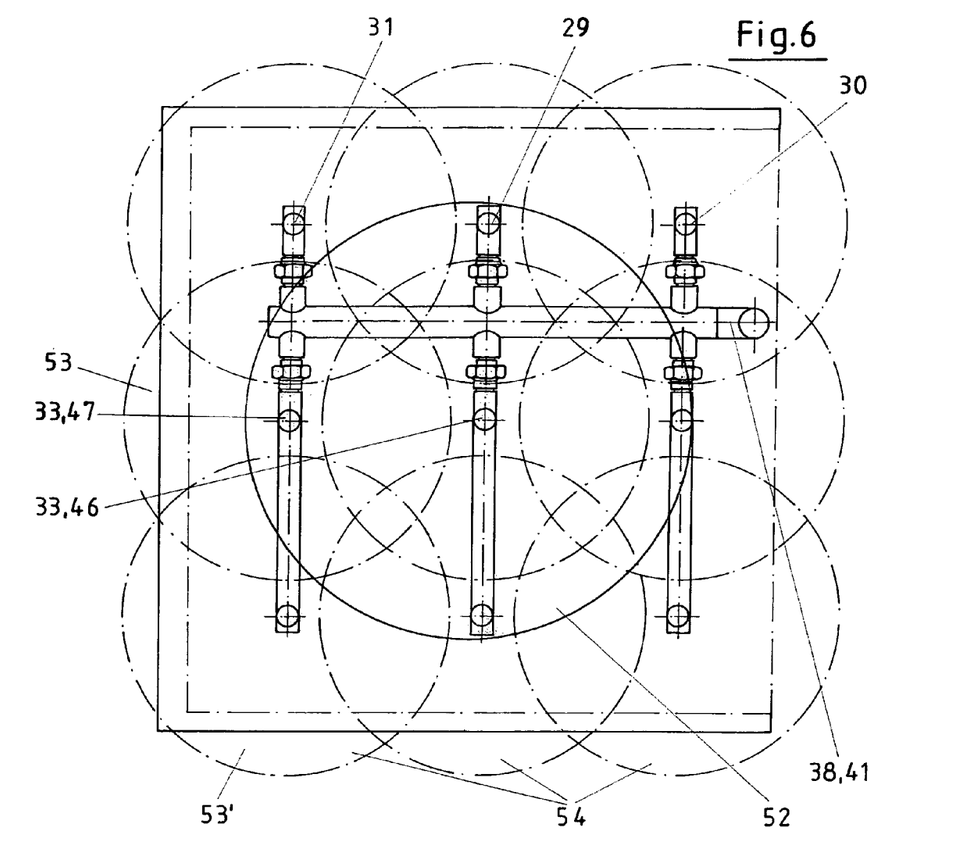
FIG. 6 illustrates a supporting frame with a large number of multiple stream nozzles.

FIG. 6 reproduces a completely circular sprinkling pattern 54 that is generated by the individual sprinkling patterns 52, 53 of the multiple stream nozzles 33. It is recognizable that the spraying patterns 52 or 53, 53' are not equally large. This rests upon the fact that the individual multiple stream nozzles 33 are not constructed identically, as FIGS. 7 and 8 make clear. The individual multiple stream nozzles 33 are moreover, as recognizable, allocated to a support frame 38 that is formed by the water supply pipes 41. In this way there exists the possibility of optimally supplying the individual multiple stream nozzles 3 with pressurized water and of arranging them selectively in such a way that the result is a recognizable overall sprinkling pattern or the complete circle sprinkling pattern 54.

Figure 7:
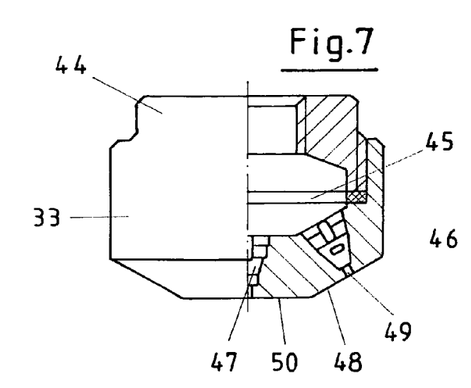
FIG. 7 illustrates a section through a multiple stream nozzle with inclines.
Figure 8:
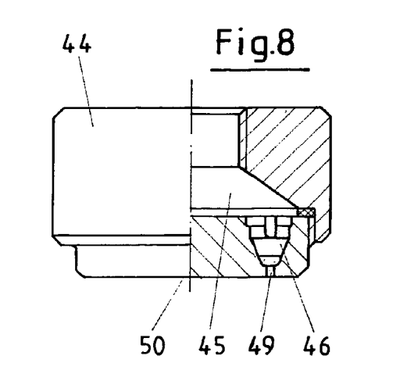
FIG. 8 illustrates a multiple stream nozzle, partially in section, with planar arrangement of the individual nozzles.

The individual multiple stream nozzles 33 have a compact housing 44 with a distribution space 45 through which the individual nozzles 46, 47 can be evenly supplied with pressurized water.

According to FIG. 8, the individual nozzles 46 are, for example, arranged in a circle so that their discharge bore holes 49 are arranged at the same height from the nozzle base 50. According to FIG. 7, a slant 47 is provided from which one part of the individual nozzle 46 discharges, while other individual nozzles 47, as in the design according to FIG. 8, discharge inside the nozzle basal surface 50. A correspondingly larger sprinkling pattern 52 results through the design according to FIG. 7 as the individual nozzles 47 discharge at a different angle and also at a different height. Despite all this, the complete circle spraying pattern 54 apparent from FIG. 6 yields optimal evenness and intensity.

All features mentioned, even those which can be inferred from the drawings alone, are viewed as essential to the invention alone and in combination.

The invention claimed is:

1. Dusting device for use behind or on dust-generating machines and/or facilities in underground mine and tunnel construction with a dusting device housing, which has as a separation element a demister provided with moistening nozzles and a drip catcher and to which a ventilator with drive arranged in the input side/output side region is allocated, wherein a plurality of said moistening nozzles are positioned in front of the demister in the air flow direction and are constructed as a plurality of multiple stream nozzles, wherein multiple streams of each multiple stream nozzle are produced by a plurality of individual nozzles, each individual nozzle having a discharge bore hole, wherein the multiple stream nozzles and the individual nozzles of the multiple stream nozzles are arranged to produce a common sprinkling pattern, so that they produce an evenly distributed screen of fine liquid mist over an entire cross-sectional area of the dusting device housing to effectively remove dust particles from the air flow, and wherein the ventilator is positioned in the clean gas stream behind the demister and drip catcher.

2. Dusting device according to claim 1, wherein the ventilator is allocated to a ventilator housing couplable onto the dusting device housing and is outfitted with sound insulation.

3. Dusting device according to claim 2, wherein the ventilator housing is allocated to a muffler serving as sound insulation that is preferably inserted downstream.

4. Dusting device according to claim 1, wherein the dusting device housing and the ventilator housing are arranged on a driving machine in a coupled state, preferably in the region between the extraction arm and the conveyor.

5. Dusting device according to claim 1, wherein the demister is arranged as an incline to the crude air directly on the input side, whereby the upper edge is constructed as a protrusion in relation to the lower edge.

6. Dusting device according to claim 1, wherein the dusting device housing and the ventilator housing possess their own supports with which they are braced on the drive assembly.

7. Dusting device according to claim 1, wherein the output side of the dusting device housing or the ventilator housing has a steering nozzle.

8. Dusting device according to claim 1, wherein air baffles are arranged between demister and drip catcher and positioned with an incline towards the floor sheet in the direction of the drip catcher.

9. Dusting device according to claim 1, wherein the multiple steam nozzles are arranged toward the crude air.

10. Dusting device according to claim 1, wherein the multiple stream nozzles are allocated to a supporting frame at an incline corresponding with the incline of the demister.

11. Dusting device according to claim 1, wherein inspection doors, preferably rotary doors, are provided on the dusting device housing in the region of the demister and the drop catcher.

12. Dusting device according to claim 1, wherein the individual multiple stream nozzle has a compact housing that is outfitted with a distribution space to which die individual nozzles are connected using a design that they sprinkle into one another.

13. Dusting device according to claim 1, wherein the individual nozzles of a multiple stream nozzle have the same diameter and identical discharge bore holes.

14. Dusting device according to claim 1, wherein some of the individual nozzles are arranged in such a way that they exit in the region of an incline of the nozzle basal surface to enlarge the sprinkling angle.

15. Dusting device according to claim 1, wherein the multiple stream nozzles with a smaller angle of sprinkling and the multiple stream nozzles with a larger sprinkling angle are arranged on the supporting frame yielding a complete circular sprinkling pattern.

16. Dusting device for use behind or on dust-generating machines and/or facilities in underground mine and tunnel construction with a dusting device housing that has a demister provided with moistening nozzles as a separating element and a drip catcher and which is allocated to a ventilator with drive located in the input side/output side region, wherein the moistening nozzles are arranged upstream of the demister in the air flow direction and are constructed as a plurality of multiple stream nozzles, wherein multiple streams of each multiple stream nozzle are produced by a plurality of individual nozzles, each individual nozzle having a discharge bore hole, wherein the multiple stream nozzles and the individual nozzles of the multiple stream nozzles are arranged to produce a common sprinkling pattern, so that they produce an evenly distributed screen of fine liquid mist over an entire cross-sectional area of the dusting device housing to effectively remove dust particles from the air flow, wherein the ventilator is positioned behind the demister and the drip catcher in the clean gas stream and wherein additive containers are provided which are constructed and arranged in such a way that they discharge into the water feed pipe through a dosing device.

17. Dusting device according to claim 16, wherein a mixer allocated to the water feed pipe or incorporated into this is inserted downstream of the dosing device.

18. Dusting device for use behind or on dust-generating machines and/or facilities in underground mine and tunnel construction with a dusting device housing which has a demister provided with moistening nozzles as a separating element and a drip catcher and which is allocated to a ventilator with drive in the input side/output side region, wherein a sprinkling device is arranged in front of the moistening nozzles and the demister with drip catcher which possesses nozzles generating most finely dispersed drops and is connected with a water supplying unit or the water feed pipe and the dosing device with mixer.

19. Method for precipitating dust behind dust-generating machines and facilities in underground mine and tunnel construction as well as for elimination of blasting smoke clouds with the gases contained therein on site, whereby the dust-containing air is energized with water nozzle-sprayed with the finest drops by a plurality of multiple stream nozzles, wherein multiple streams of each multiple stream nozzle are produced by a plurality of individual nozzles, each individual nozzle having a discharge bore hole, wherein the multiple stream nozzles and the individual nozzles of the multiple stream nozzles are arranged to produce a common sprinkling pattern, so that they produce an evenly distributed screen of fine liquid mist over an entire cross-sectional area of the dusting device housing to effectively remove dust particles from the air flow, whereupon the mud arising is collected and the moist air is dried by separation of water drops and is then transferred into the clean gas stream, wherein the smoke cloud arising in blasting is energized with water nozzle-sprayed with the finest drops through the device precipitating the dust in succession to which additives are previously admixed that enter into an environmentally tolerable compound with the nitrous and similar gases released during blasting.

20. Method according to claim 19, wherein additive-enriched water is intensively brought into connection with the blasting smoke cloud at a distance upstream of the apparatus precipitating the dust and whereby water is sprinkled on it.

21. The dusting device of claim 15, wherein the smaller angle is about 60° and the larger angle is about 120°.

* * * * *